United States Patent
Chandler et al.

(10) Patent No.: US 8,360,215 B2
(45) Date of Patent: Jan. 29, 2013

(54) TWO-STAGE SLAVE CYLINDER

(75) Inventors: Edward L. Chandler, St. Joseph, MI (US); Brian P. Dennis, Kalamazoo, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 625 days.

(21) Appl. No.: 12/319,620

(22) Filed: Jan. 9, 2009

(65) Prior Publication Data

US 2010/0175954 A1 Jul. 15, 2010

(51) Int. Cl.
*F16F 9/00* (2006.01)
*F16D 55/08* (2006.01)

(52) U.S. Cl. .............. 188/317; 188/72.4; 188/322.15

(58) Field of Classification Search .......... 188/72.1, 188/72.4, 151 R, 152, 170, 352, 316–318, 188/322.13, 322.15; 137/625.12, 625.13
See application file for complete search history.

(56) References Cited

U.S. PATENT DOCUMENTS

| | | | |
|---|---|---|---|
| 2,227,245 A | | 12/1940 | Carroll |
| 3,275,009 A | * | 9/1966 | Frania et al. ............ 137/47 |
| 3,321,913 A | * | 5/1967 | Harrah ............ 60/590 |
| 3,828,894 A | | 8/1974 | Crossman |
| 3,908,804 A | * | 9/1975 | Cochran ............ 188/170 |
| 5,072,811 A | | 12/1991 | Everhard |
| 6,017,010 A | * | 1/2000 | Cui ............ 248/288.31 |
| 2003/0213663 A1 | * | 11/2003 | Salice ............ 188/284 |
| 2005/0013658 A1 | * | 1/2005 | Muders et al. ............ 403/122 |
| 2006/0097566 A1 | * | 5/2006 | Sommerfeld ............ 303/15 |

FOREIGN PATENT DOCUMENTS

EP 0154769 9/1985

OTHER PUBLICATIONS

Drawing No. 36991 of Auto Specialties Mfg. Co., St. Joseph, MI (Nov. 30, 1983).
Brochure of Knott GmbH, Eggstatt, Germany (undated but prior to the invention of the Applicants).
International Search Report & Written Opinion for International Application No. PCT/US2009/157275; dated Dec. 29, 2011; 5 pages.

* cited by examiner

*Primary Examiner* — Melody Burch
(74) *Attorney, Agent, or Firm* — Renner, Kenner, Greive, Bobak, Taylor & Weber

(57) ABSTRACT

A two-stage slave cylinder including a housing and a bore extending within the housing. An outer piston is slidably positioned within the bore in the housing, and an outer piston chamber is defined by the bore and the outer piston. The outer piston chamber is connected to a hydraulic fluid source by a fluid passageway. A biasing mechanism acts to bias the outer piston in an unactuated position unless a force is exerted on the outer piston that is greater than the biasing force. A bore is provided in the outer piston, and an inner piston is slidably positioned therein. An inner piston chamber is defined by the bore and the inner piston, and an opening is provided in the outer piston to connect the outer piston chamber to the inner piston chamber. A valve assembly is provided within the opening in the outer piston to control the flow of fluid between the outer piston chamber and the inner piston chamber.

13 Claims, 11 Drawing Sheets

TWO-STAGE SLAVE CYLINDER

TECHNICAL FIELD

This invention relates to a slave cylinder that is particularly useful in a multi-disc wet brake and includes two stages of piston actuation. More particularly, this invention relates to such a slave cylinder wherein two concentric pistons are provided, the inner piston being actuated to take up running clearance in the brake, and the outer piston being actuated to provide a braking force.

BACKGROUND ART

Multi-disc wet brakes are well known in the art of braking systems and are available with a variety of actuation mechanisms. Such multi-disc wet brakes employ a disc assembly having plurality of alternating stationary and rotating discs to generate a braking force. The stationary discs are rotationally secured to a pin or other object within the brake housing to prevent rotation thereof, whereas the rotating discs are rotationally engaged with a shaft, the shaft itself being rotationally coupled to a vehicle axle. During normal operating conditions, rotation of the shaft causes rotation of the rotating discs. A clearance is provided between each rotating disc and the adjacent stationary discs to facilitate such rotation, thereby allowing the vehicle to move freely. When the brake is actuated, an actuating mechanism acts upon a primary stationary disc to compress the disc assembly, thereby creating friction at each interface between a rotating disc and a stationary disc. This friction created within the disc assembly acts as a braking force to first slow, and ultimately stop, rotation of the rotating discs. A fluid is provided within the brake housing to absorb the heat generated by the friction between discs during braking conditions, thereby cooling and improving the efficiency of the brake.

A common problem associated with multi-disc wet brakes relates to actuation of the brake to compress the alternating stationary and rotating discs of the disc assembly. A hydraulic slave cylinder is often provided as an actuating mechanism, and includes a piston and a piston rod that, when actuated, acts upon the primary stationary disc either directly or indirectly to compress the disc assembly. However, due to the clearance provided on either side of each of the rotating discs during normal operation of the vehicle, the piston of the slave cylinder must have a relatively long stroke in order to take up the total clearance within the disc assembly.

The increased piston stroke necessary to actuate conventional multi-disc wet brake results in at least two significant disadvantages. One such disadvantage is an increased response time of the brake due to the time it takes for the piston to take up the running clearance within the disc assembly. Little braking force is generated by the disc assembly until all of the running clearances between the stationary and rotating discs have been eliminated. Thus, a time delay occurs between the initial actuation of the slave cylinder and the time when a braking force acts upon the rotating shaft. Another disadvantage is the volume of brake fluid necessary to effect the increased piston stroke. The volume of fluid provided by the master cylinder to the slave cylinder is frequently insufficient to generate the piston stroke needed in multi-disc wet brakes. The conventional solution to this problem is to add a power booster to the brake system, which is not cost effective.

Thus, the need exists for a multi-disc wet brake having a slave cylinder that provides an improved response time and requires a relatively smaller amount of brake fluid for actuation of the multi-disc wet.

DISCLOSURE OF THE INVENTION

It is thus an object of one aspect of the present invention to provide a multi-disc wet brake with a slave cylinder having an improved response time.

It is an object of another aspect of the present invention to provide a multi-disc wet brake, as above, with a slave cylinder that requires less brake fluid to actuate the brake.

It is an object of a further aspect of the present invention to provide a multi-disc wet brake, as above, that does not require expensive components to generate the desired braking forces.

These and other objects of the present invention, as well as the advantages thereof over existing prior art forms, which will become apparent from the description to follow, are accomplished by the improvements hereinafter described and claimed.

In general, a slave cylinder according to at least one aspect of the present invention includes a housing with a bore therein and an outer piston slidably positioned within the bore. A bore is provided in the outer piston, and an inner piston is slidably positioned within the bore in the outer piston.

In accordance with at least one aspect of the present invention, a two-stage slave cylinder includes a housing having a bore therein and an outer piston slidably positioned within the bore. An outer piston chamber is defined by the bore and the outer piston, and a fluid passageway is adapted to connect the outer piston chamber to a hydraulic fluid source. A biasing mechanism acts to bias the outer piston in an unactuated position. A bore is provided in the outer piston, and an inner piston is slidably positioned within the bore in the outer piston. An inner piston chamber is defined by the bore and the inner piston, and an opening in the outer piston is provided to connect the outer piston chamber to the inner piston chamber.

In accordance with at least one aspect of the present invention, a multi-disc wet brake includes a housing and a slave cylinder within the housing. A bore is provided in the slave cylinder, and a first piston is slidably positioned in the bore. The first piston also includes a bore, and a second piston is slidably positioned in the bore in the first piston. A piston rod communicates with the second piston such that upon actuation of the brake the piston rod is adapted to act upon the disc assembly to provide a braking force.

A preferred exemplary slave cylinder for a multi-disc wet brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

One embodiment of a slave cylinder made in accordance with the present invention is shown in FIGS. 1-3C and is indicated generally by the numeral 10. Slave cylinder 10 may be mounted within a multi-disc wet brake to provide an actuating force to a disc assembly by engaging a primary stationary disc to compress the alternating stationary and rotating discs, as is well known in the art of braking systems. Although the arrangement shown is adapted for use with a multi-disc wet brake, it is also contemplated that slave cylinder 10 may be used in other mechanisms that employ a slave cylinder for actuation purposes.

Figure 1:
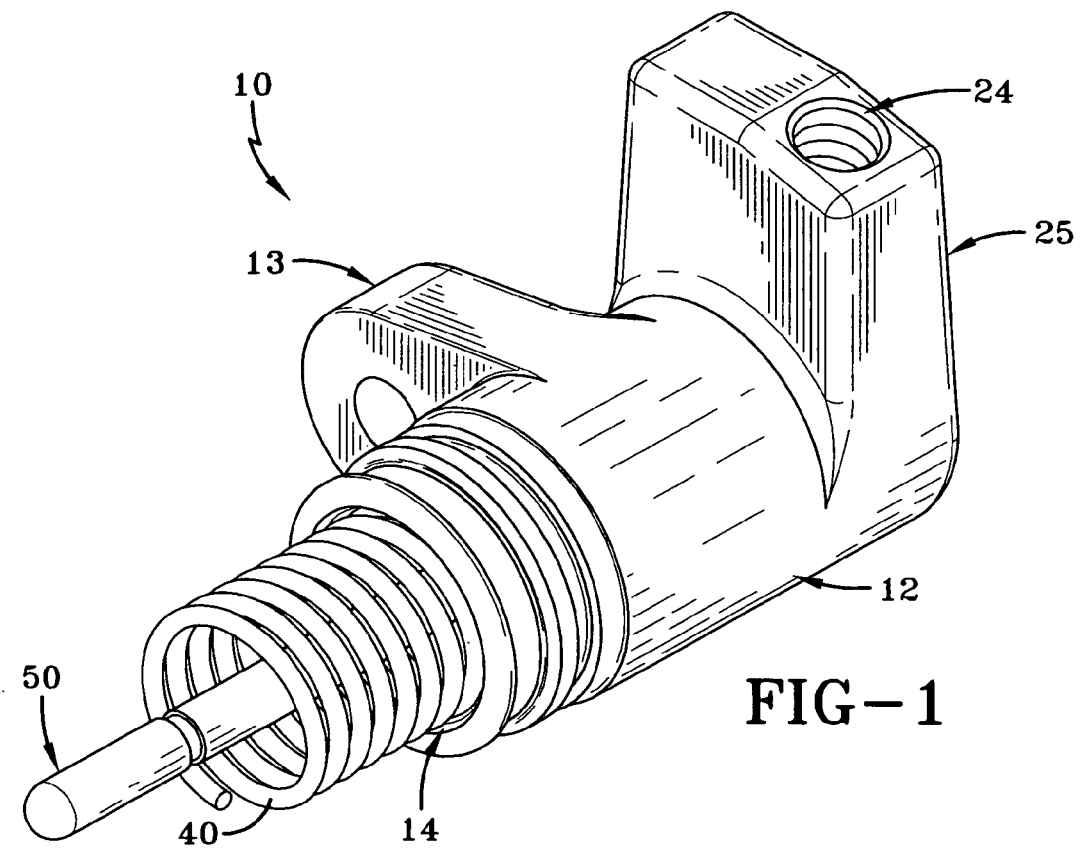
FIG. 1 is a perspective view of one embodiment of a slave cylinder according to the concepts of the present invention.
Figure 2:
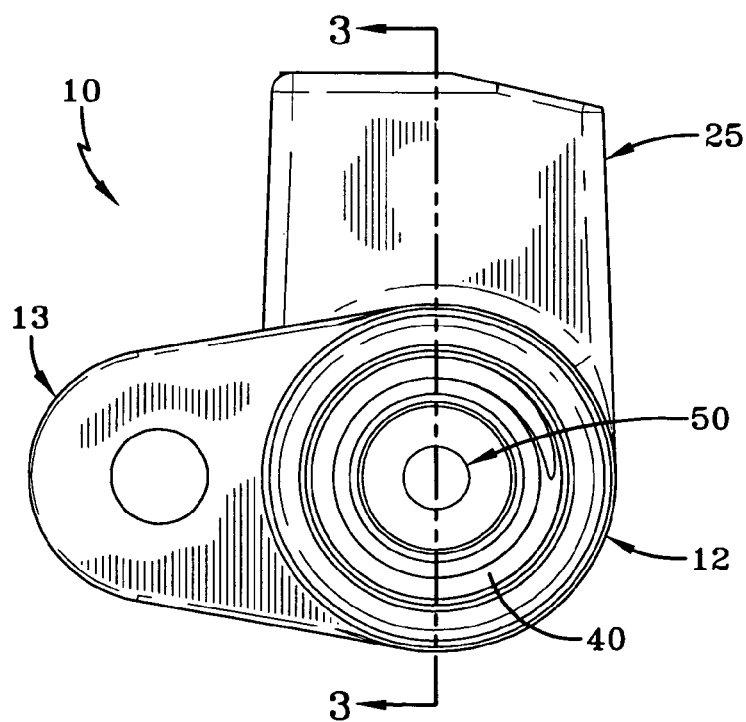
FIG. 2 is an end view of the slave cylinder of FIG. 1.
Figure 3A:
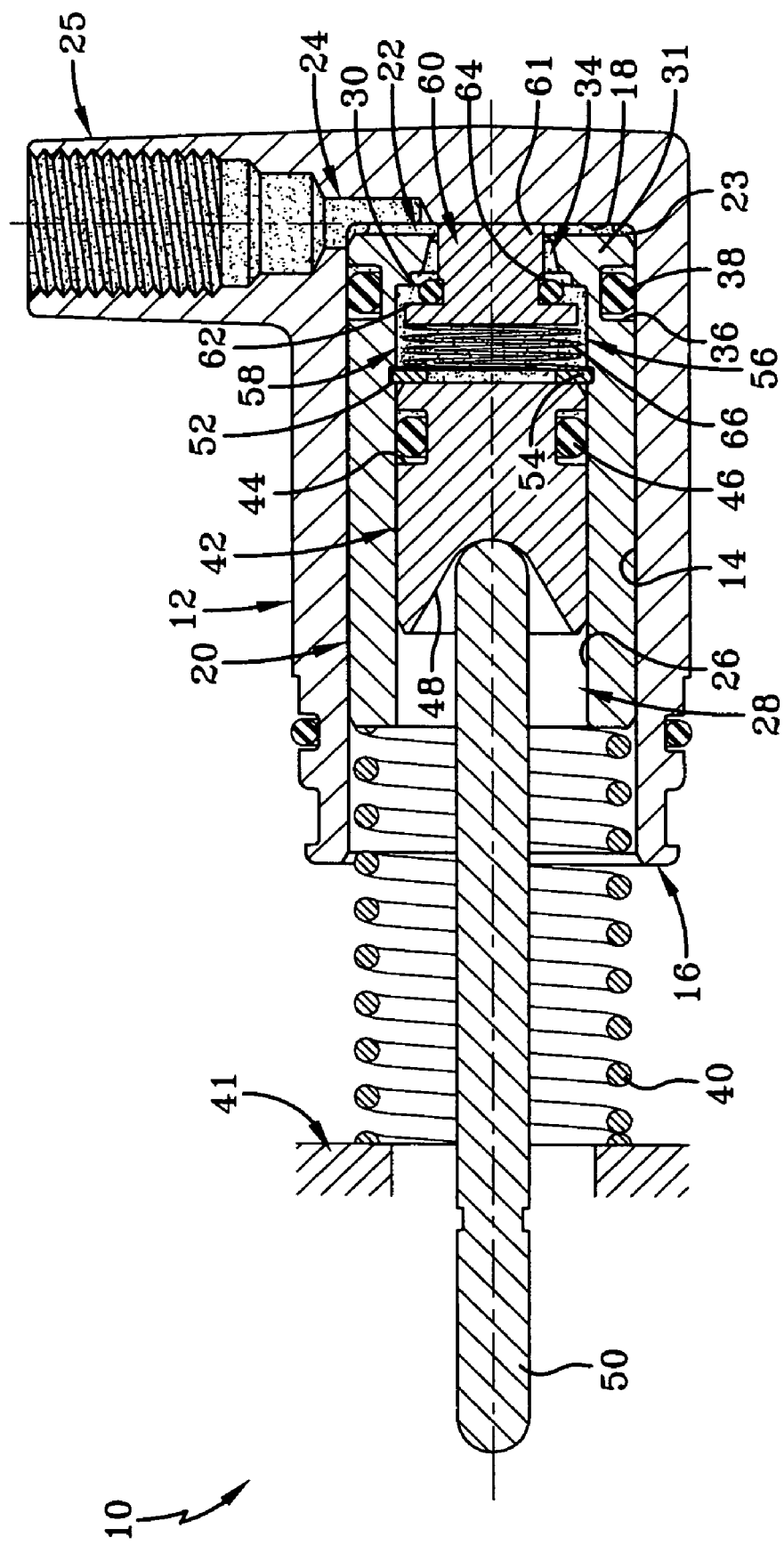
FIG. 3A is a sectional view of the slave cylinder taken substantially along line 3-3 of FIG. 2 and shown in an unactuated position.
Figure 3B:
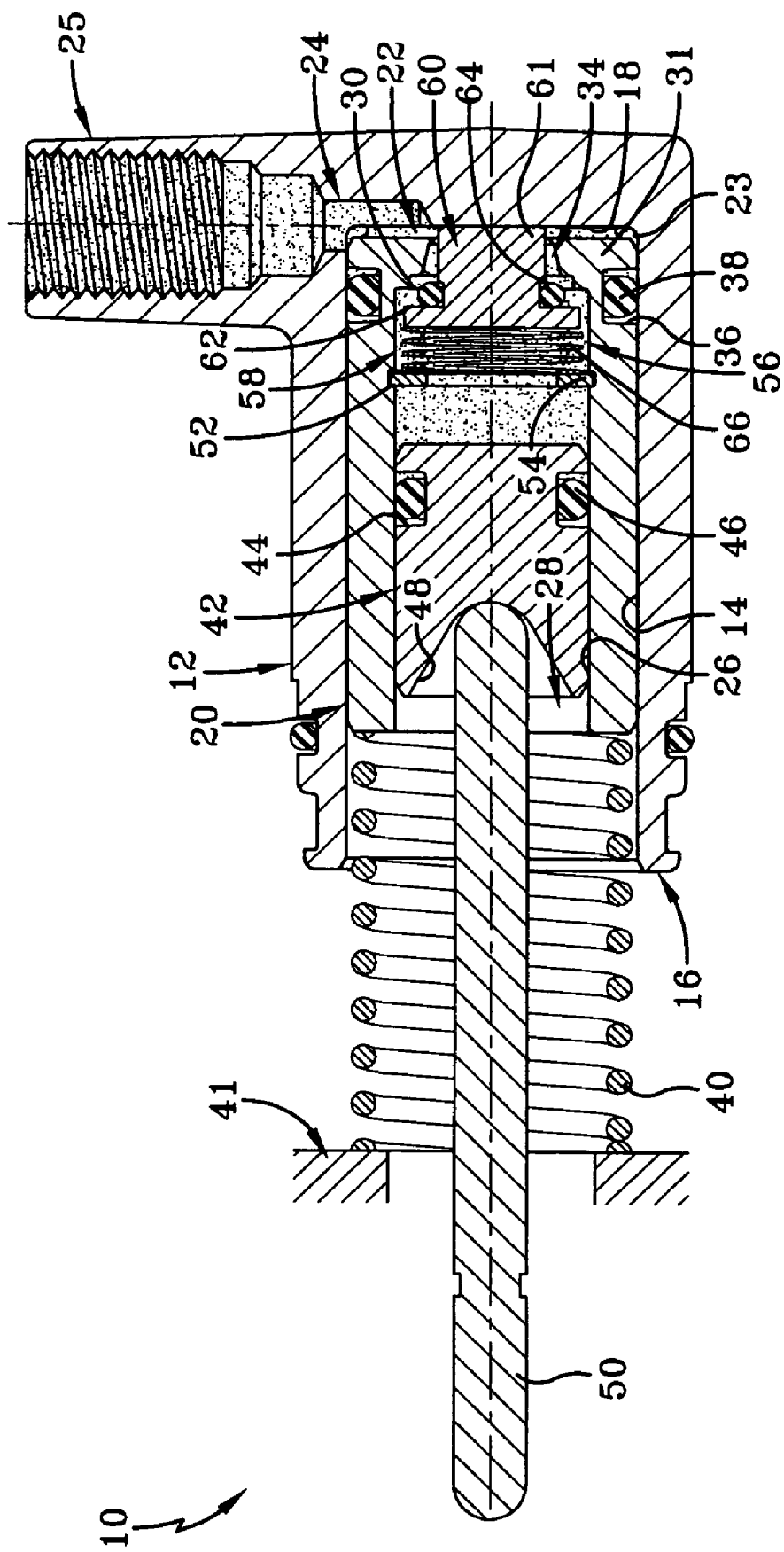
FIG. 3B is a sectional view like FIG. 3A but showing the inner piston in an actuated position.
Figure 3C:
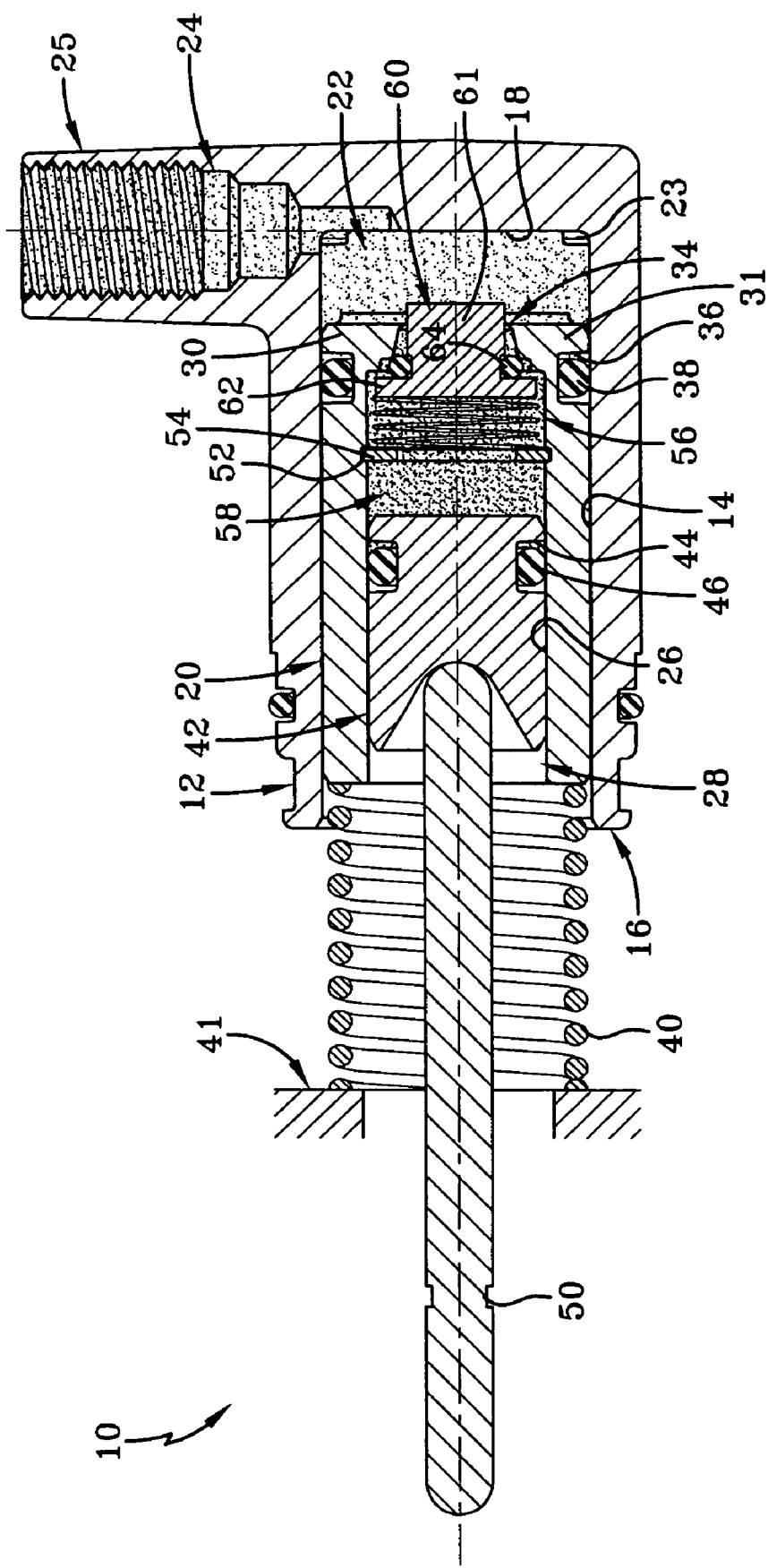
FIG. 3C is a sectional view like FIG. 3B but showing the outer piston in an actuated position.

Slave cylinder 10 includes a generally cylindrical housing 12 having a generally cylindrical bore 14 therein. Housing 12 may include a radial projection 13 to facilitate mounting slave cylinder 10 within a brake or other device. Bore 14 is positioned generally concentrically within housing 12 and is open at end 16 and is closed at its other end at surface 18. A generally cylindrical outer piston 20 is disposed within bore 14 and has an axial length less than the axial length of bore 14 (FIGS. 3A, 3B, and 3C). An outer fluid chamber 22 is defined by bore 14 and outer piston 20 adjacent to inner end surface 18. A piston stop 23 may be provided proximate to end surface 18 to prevent outer piston 20 from contacting end surface 18. Stop 23 may be machined into outer piston 20 or housing 12 adjacent to end surface 18, or may be provided in the form of an annular insert or any other suitable form known to those skilled in the art. Outer fluid chamber 22 is in fluid communication with a master cylinder (not shown) through fluid passageway 24 extending through a radial projection 25 of housing 12. The master cylinder contains a hydraulic fluid which may be selectively forced through fluid passageway 24 and into outer piston chamber 22 to actuate the slave cylinder, as is well known in the art. Piston stop 23 acts to ensure that hydraulic fluid can flow through passageway 24 and into outer piston chamber 22, as will be described in greater detail herein below.

Outer piston 20 has a bore 26 therein that includes an open end 28 and terminates at the opposite end by a valve wall 30 formed by a flange 31 at the end of outer piston 20. Flange 31 has an opening 34 therein allowing bore 26 of outer piston 20 to be selectively connected with outer fluid chamber 22. An annular recess 36 is provided on the exterior of outer piston 20, and an annular seal 38 is provided within annular recess 36 and in contact with bore 14, thereby preventing hydraulic fluid from traveling around outer piston 20 away from outer piston chamber 22. A compression spring 40 is engaged with outer piston 20 adjacent to open end 16 and acts to bias slave cylinder 10 in an unactuated position by forcing outer piston 20 against piston stop 23. Compression spring 40 is engaged at its opposite end by a portion of the brake housing 41, or another fixed surface. It will be appreciated by those skilled in the art that while a compression spring is disclosed, other biasing mechanisms may be used to obtain the same biasing effect achieved by compression spring 40.

A generally cylindrical inner piston 42 is positioned within bore 26 of outer piston 20 and is slidable in an axial direction. An annular recess 44 is provided on the outside of inner piston 42, and an annular seal 46 is received therein and is in contact with bore 26, thereby preventing hydraulic fluid from traveling around inner piston 42 away from outer piston chamber 22. Inner piston 42 includes a piston rod recess 48 in an end opposite outer piston chamber 22 that receives one end of a piston rod 50 therein. The other end of piston rod 50 is adapted to engage the primary stationary disc (not shown) within a multi-disc wet brake to move the primary stationary disc axially and compress the stationary and rotating discs within the brake, as is known in the art. An annular recess 52 is provided within bore 26, and an annular retaining ring 54 is positioned in recess 52. Annular retaining ring 54 acts as a stop to maintain inner piston 42 in a displaced position from valve wall 30. Inner piston 42 is biased against retaining ring 54 when slave cylinder 10 is in an unactuated state by brake return springs (not shown) that act to bias the primary stationary disc toward slave cylinder 10. The bias of such springs also acts to maintain the required clearances between the alternating stationary and rotating discs of the multi-disc wet brake to permit rotation of the rotating discs during normal operating conditions.

A valve assembly 56 is provided within opening 34 of outer piston 20 to selectively allow hydraulic fluid to fill an inner piston chamber 58 defined by inner piston 42, bore 26, and valve wall 30 of outer piston 20. The valve assembly depicted in FIGS. 3A-3C includes a plug 60 having a body 61 and an annular flange 62 extending from body 61. Body 61 is received through opening 34 in valve wall 30, and annular flange 62 engages valve wall 30 within inner piston chamber 58 to prevent plug 60 from being removed therefrom. An annular seal 64 is provided around body 61 of plug 60 adjacent to flange 62 to create a seal between plug 60 and flange 31 of outer piston 20. A compression spring 66 is provided within inner piston chamber 58 between plug 60 and retaining ring 54 to bias the valve assembly in a closed position. Compression spring 66 provides a lesser biasing force as compared to compression spring 40.

Slave cylinder 10 is shown in FIG. 3A in an unactuated state, with valve assembly 56 opened, inner piston 42 biased against retaining ring 54, and outer piston 20 biased against stop 23 by compression spring 40. Plug 60 is in contact with end surface 18 of bore 14 to maintain a displacement of seal 64 from flange 31. When slave cylinder 10 is actuated, pressurized hydraulic fluid is provided from the master cylinder through fluid passageway 24 and into outer piston chamber 22. The pressurized hydraulic fluid flows around plug 60, through opening 34, and into inner piston chamber 58. As pressurized hydraulic fluid fills inner piston chamber 58, inner piston 42 and piston rod 50 are forced to slide axially away from plug 60. This axial movement acts to compress the disc assembly of the brake and eliminate the running clearances between the rotating and stationary discs due to engagement of piston rod 50 with a primary disc of the disc assembly.

Once a predetermined pressure has been reached within outer piston chamber 22, outer piston 20 is caused to move away from end surface 18. The pressure threshold is determined by the force exerted on outer piston 20 by spring 40. Movement of outer piston 20 away from end surface 18 allows plug 60 to move towards flange 31, resulting in the closing of valve assembly 56, thereby preventing additional fluid flow into or out of inner piston chamber 58. The trapped fluid links the inner and outer pistons together to allow them to act as a single piston. After valve assembly 56 has been closed, the pressurized hydraulic fluid acts upon outer piston 20 to cause it to move axially away from end surface 18 and against the biasing force of compression spring 40 (FIG. 3C). Because the running clearances between the discs of the brake have already been taken up by movement of inner piston 42, movement of outer piston 20 immediately creates a braking force. Pressure is applied to the rotating discs by the stationary discs due to the force transferred through piston rod 50 and the primary stationary disc of the disc assembly, which acts to further compress the disc assembly. The increased surface area available on outer piston 20 for the hydraulic fluid to act upon provides increased mechanical advantage in generating the braking force, while the smaller inner piston 42 requires less hydraulic fluid to take up the running clearances of the discs.

Figure 4A:
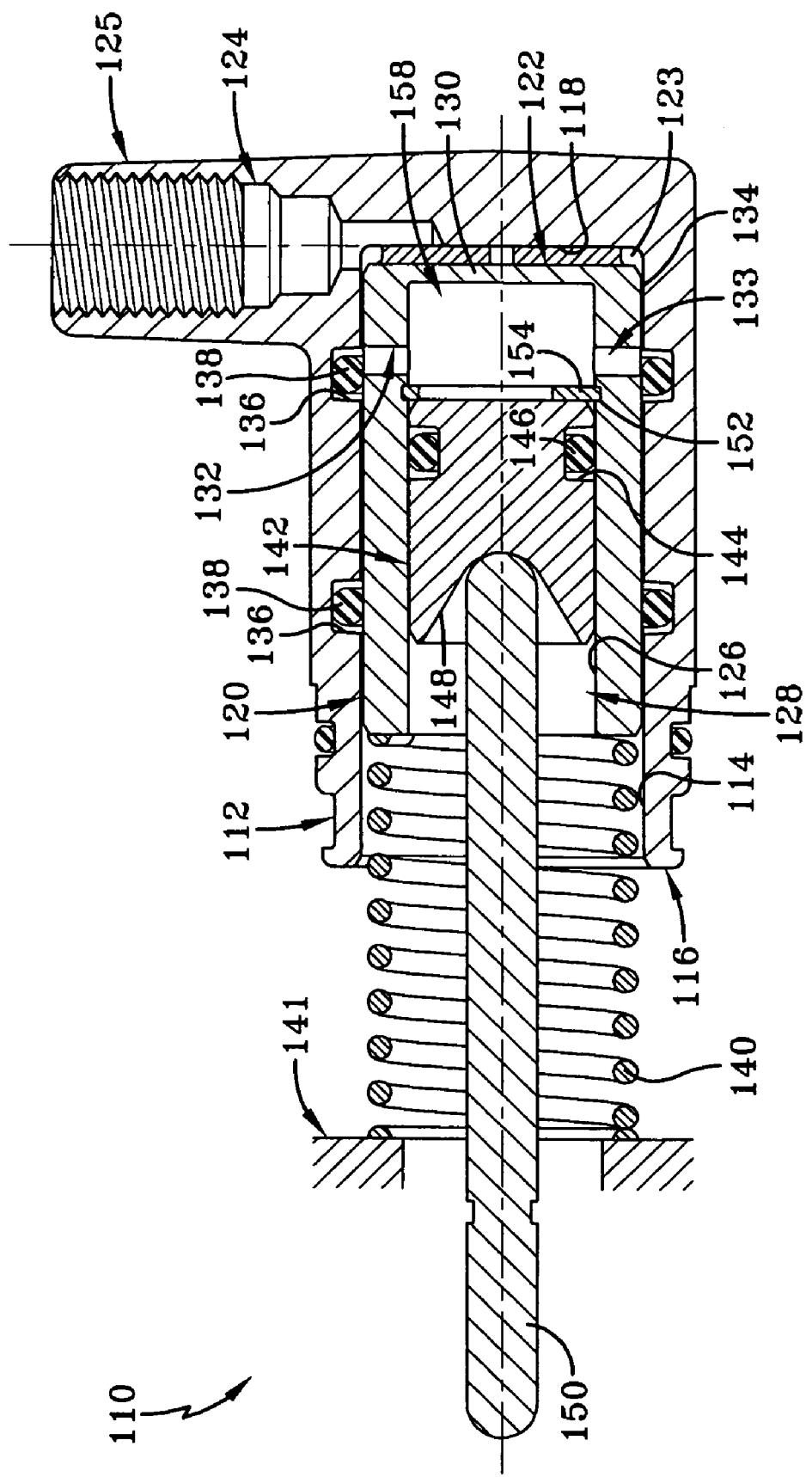
FIG. 4A is a sectional view of another embodiment of a slave cylinder according to the concepts of the present invention shown in an unactuated position.
Figure 4B:
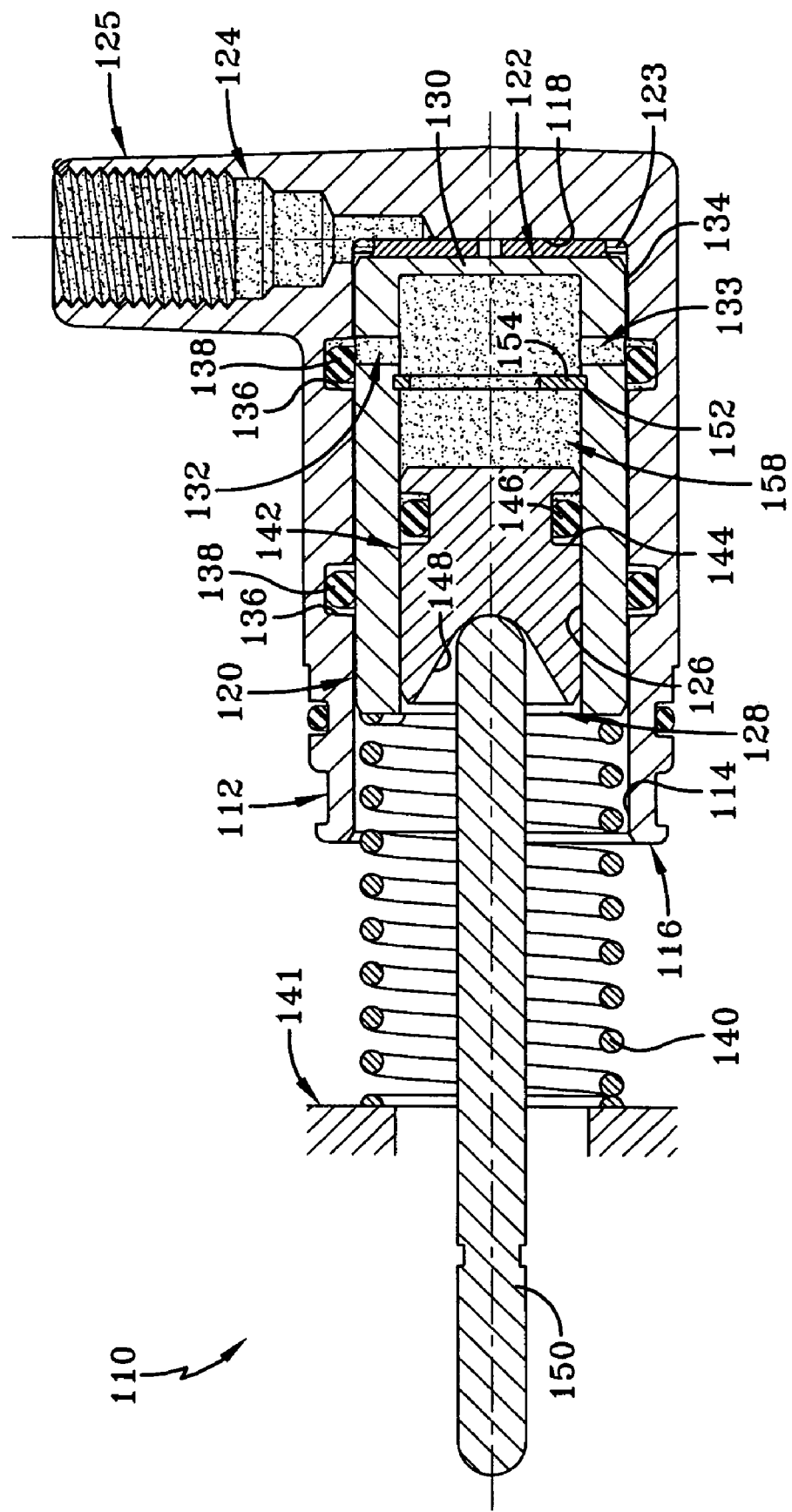
FIG. 4B is a sectional view like FIG. 4A but showing the inner piston in an actuated position.
Figure 4C:
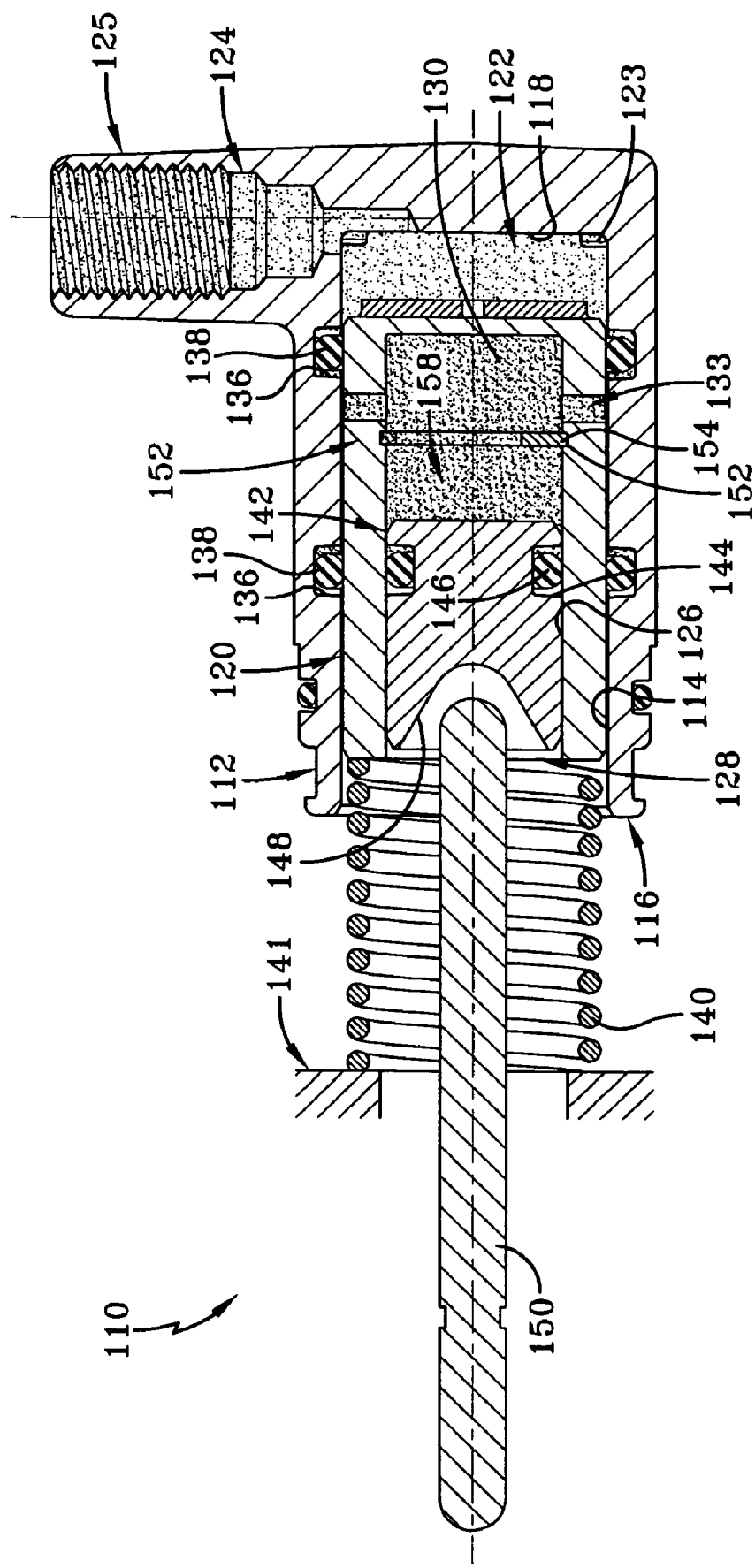
FIG. 4C is a sectional view like FIG. 4B but showing the outer piston in an actuated position.
Figure 5:
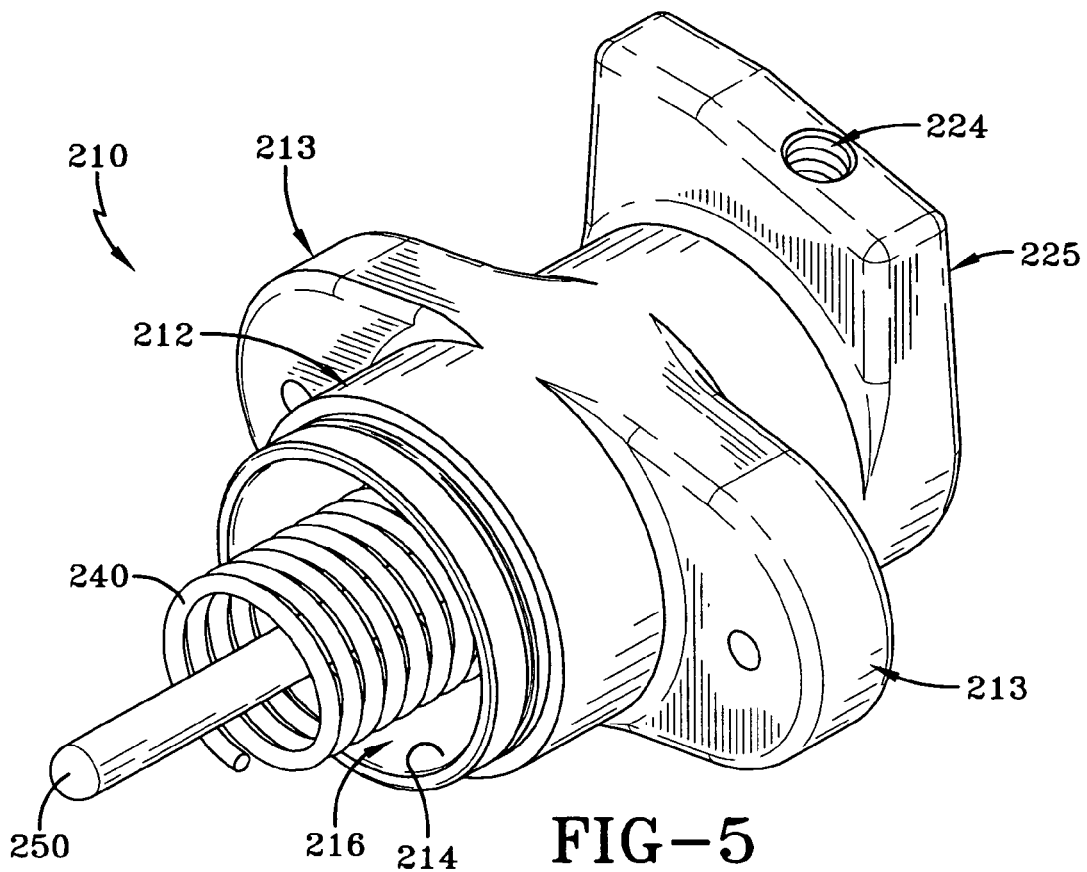
FIG. 5 is a perspective view of another embodiment of a slave cylinder according to the concepts of the present invention.
Figure 6:
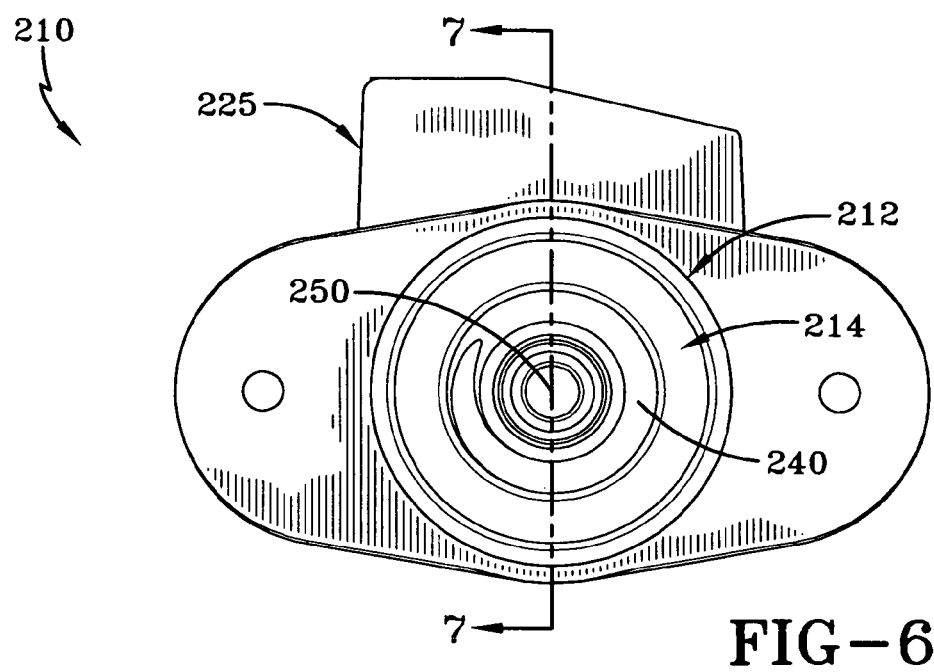
FIG. 6 is an end view of the slave cylinder of FIG. 5.

Another embodiment of the slave cylinder is shown in FIGS. 4A-4C and is indicated generally by the numeral 110. Slave cylinder 110 is substantially identical to slave cylinder 10 discussed above, except that it includes an alternative valve assembly for controlling the flow of hydraulic fluid therein. Thus, slave cylinder 110 includes a housing 112 having a bore 114 which is open at one end 116 and closed at its other end at surface 118. An outer piston 120 is slidably positioned within bore 114 and is biased against a stop 123 when in an unactuated position. An outer piston chamber 122 is defined by bore 114 and outer piston 120 adjacent to end surface 118. A fluid passageway 124 extends through a radial projection 125 of housing 112 and connects outer piston chamber 122 to a master cylinder (not shown) to facilitate hydraulic fluid flow therebetween. A bore 126 is provided within outer piston 120 and includes an open end 128 and an end wall 130.

Unlike slave cylinder 10 discussed herein, end wall 130 does not include an opening. Instead, channels 132 and 133 are provided in outer piston 120 and a space 134 is provided around outer piston 120, to allow fluid flow from outer piston chamber 122 into bore 126. Fluid filling outer piston chamber 122 flows between outer piston 120 and bore 114 to channels 132 and 133. Two annular recesses 136 are provided in housing 112, and an annular seal 138 is positioned within each recess and in contact with outer piston 120 to prevent fluid flow therebetween. A compression spring 140 is positioned within bore 114 and is in contact with outer piston 120 adjacent to open end 128 to bias outer piston 120 in an unactuated position. Compression spring 140 is in contact with the brake housing 141, or another stationary surface, at its opposite end.

An inner piston 142 is slidably positioned within bore 126 of outer piston 120, and includes an annular recess 144 which receives an annular seal 146 therein, and a piston rod recess 148 which receives a piston rod 150 therein. An annular recess 152 is provided in bore 126 of outer piston 120, and a retaining ring 154 is received therein to prevent inner piston 142 from sliding axially toward end wall 130 of outer piston 120. An Inner piston chamber 158 is defined by bore 126, inner piston 142, and end wall 130. Channels 132 and 133 are diametrically opposed to one another, and are positioned axially between retaining ring 154 and end wall 130 within inner piston chamber 158.

Slave cylinder 110 is shown in FIG. 4A in an unactuated state, with inner piston 142 biased against retaining ring 154 by springs within the brake and outer piston 120 biased against stop 123 by compression spring 140. When slave cylinder 110 is actuated, pressurized hydraulic fluid is provided from the master cylinder through fluid passageway 124 and into outer piston chamber 122. The pressurized hydraulic fluid is then forced between outer piston 120 and bore 114 to channels 132 and 133, thereby allowing hydraulic fluid to flow into inner piston chamber 158 (FIG. 4B). As pressurized hydraulic fluid fills inner piston chamber 158, inner piston 142 and piston rod 150 are forced to slide axially away from retaining ring 154 to take up the running clearance between the discs within the brake. Once a predetermined pressure has been reached within outer piston chamber 122, the force generated by the fluid pressure begins acting upon outer piston 120 to cause it to overcome the biasing force of spring 140. The force of the fluid acting on outer piston 120 causes it to move axially away from end surface 118 of bore 114. When outer piston 120 moves, channels 132 and 133 are also caused to moved axially past a first annular seal 138, thereby preventing additional fluid flow into or out of inner piston chamber 158. The fluid trapped within inner piston chamber 158 links both pistons together so that they act as a single piston. Outer piston 120 and inner piston 142 are then caused to move axially against the biasing force of compression spring 140 to create a braking force.

An additional embodiment of the slave cylinder is shown in FIGS. 5-7C and is indicated generally by the numeral 210. Slave cylinder 210 is substantially identical to slave cylinder 10 and slave cylinder 110 discussed above, except that it includes an alternative valve assembly for controlling the flow of hydraulic fluid therein. Slave cylinder 210 includes a housing 212 having a bore 214 which is open at one end 216 and is closed at the other end at surface 218. Housing 112 includes opposed radial projections 213 to facilitate mounting of slave cylinder 210. An aperture 217 provides an opening into bore 214 from the exterior of housing 212, and has a threaded plug 219 disposed therein, as will be discussed in greater detail below.

An outer piston 220 is slidably positioned within bore 214. An outer piston chamber 222 is defined by bore 214 and outer piston 220 adjacent to end surface 218, and a piston stop 223 may be provided proximate to end surface 218 to prevent outer piston 220 from contacting end surface 218. A fluid passageway 224 extends through a radial projection 225 of housing 212 and connects outer piston chamber 222 to a master cylinder (not shown) to facilitate hydraulic fluid flow therebetween. Outer piston 220 is provided with a bore 226, which is open at one end 228 and terminates at the other end at valve wall 230 defined by flange 231. Bore 226 may be provided with a first portion 227 having a larger diameter to receive a compression spring 240 therein. Compression spring 240 acts to bias outer piston 220 toward end surface 218, and is in contact at its opposite end with a surface of the brake housing 241, or other stationary surface. Flanges 231 include an opening 234 therethrough positioned opposite opening 217 and plug 219. An annular recess 236 is provided in outer piston 220, and an annular seal 238 is positioned therein and is in contact with bore 214 to prevent fluid flow therebetween.

Figure 7A:
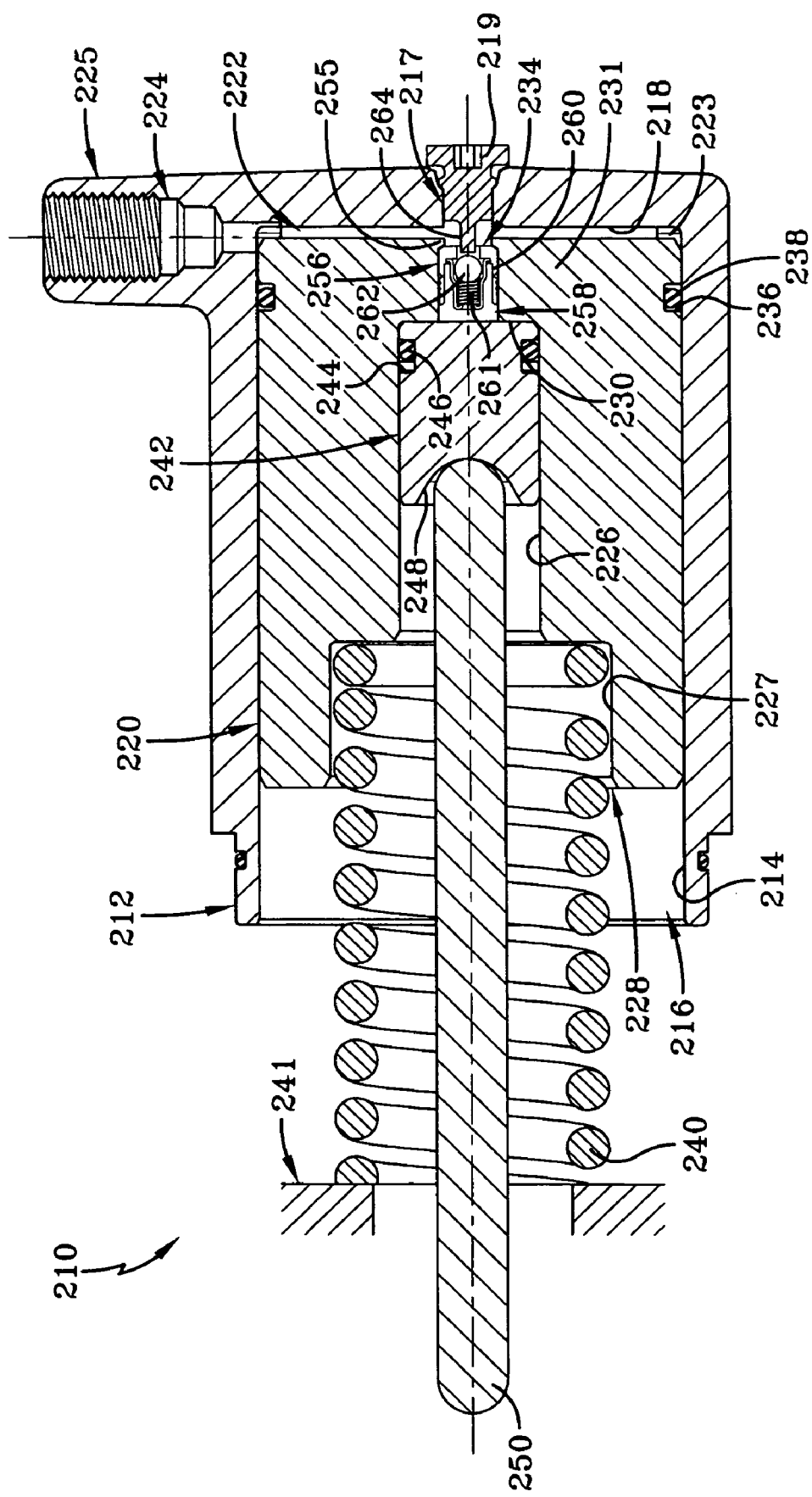
FIG. 7A is a sectional view of the slave cylinder taken substantially along line 7-7 of FIG. 6 and shown in an unactuated position.

An inner piston 242 is slidably positioned within bore 226 of outer piston 220, and includes an annular recess 244 which receives an annular seal 246 therein, and a piston rod recess 248 which receives a piston rod 250 therein. An inner piston chamber 258 is defined by bore 226 (FIG. 7B), inner piston 242, and valve wall 230, and is in fluid communication with outer piston chamber 222 through opening 234 in valve wall 230. An annular flange 255 of valve wall 230 extends into opening 234 adjacent to outer piston chamber 222. A valve assembly 256 is provided within opening 234 of valve wall 230 to selectively allow hydraulic fluid to fill inner piston chamber 258, and is secured therein in one axial direction by flange 255. Valve assembly 256 includes a ball valve having a cage 260 secured within opening 234 to prevent axial movement thereof, a compression spring 261 secured at one end within cage 260, and a ball 262 positioned at the other end of compression spring 261 adjacent to outer piston chamber 222. Plug 219 in opening 217 of housing 212 includes a projection 264 extending into opening 234 in valve wall 230 and engaging ball 262 when slave cylinder 210 is in an unactuated state, as shown in FIG. 7A.

Figure 7B:
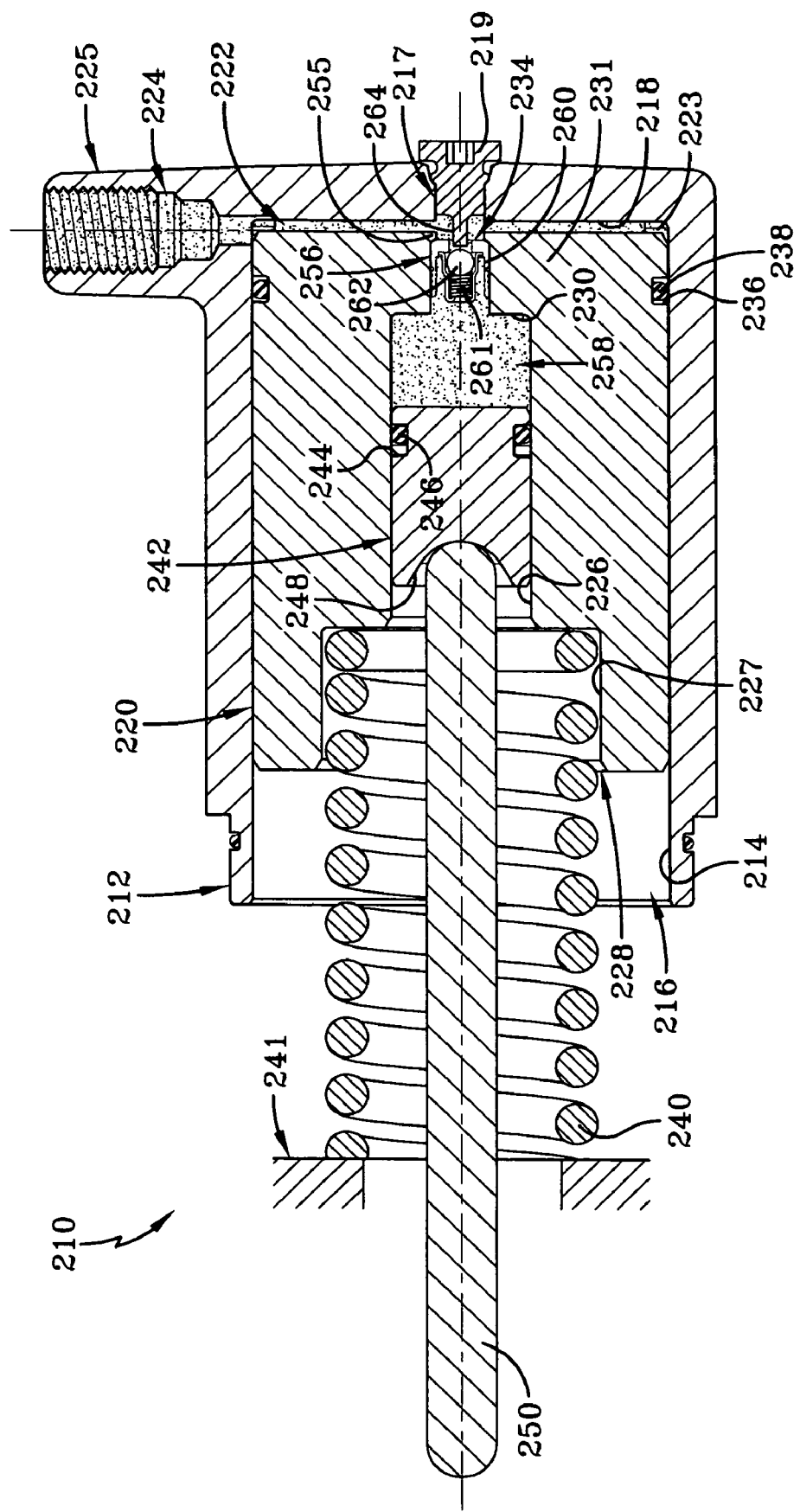
FIG. 7B is a sectional view like FIG. 7A but showing the inner piston in an actuated position.
Figure 7C:
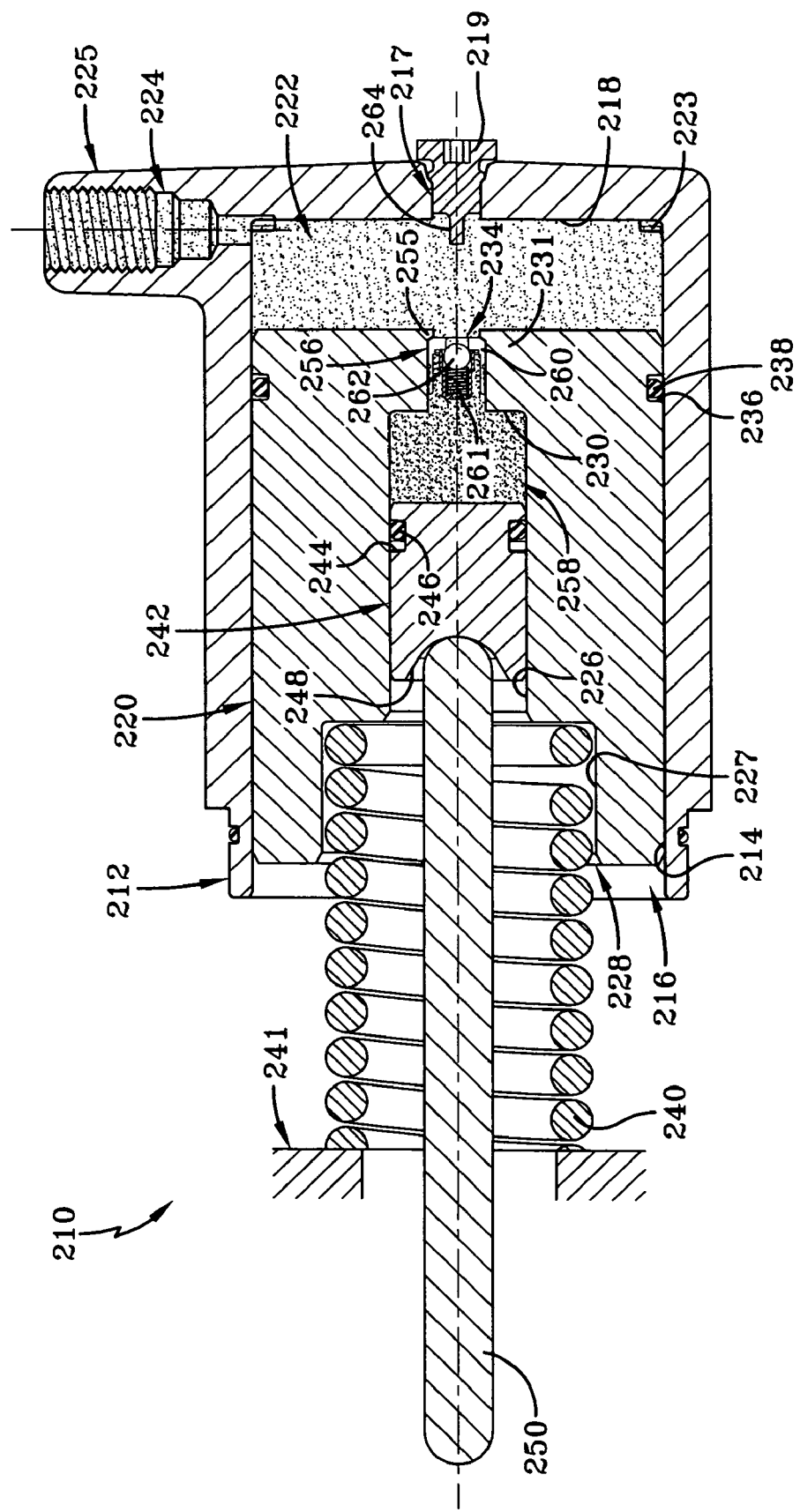
FIG. 7C is a sectional view like FIG. 7B but showing the outer piston in an actuated position.

When slave cylinder 210 is actuated, pressurized hydraulic fluid is provided from the master cylinder through fluid passageway 224 and into outer piston chamber 222. The pressurized hydraulic fluid then travels through opening 234 in valve wall 230 and into inner piston chamber 258. Projection 264 of plug 219 prevents ball 262 from sealing against cage 260, as shown in FIG. 7A. As pressurized hydraulic fluid fills inner piston chamber 258, inner piston 242 and piston rod 250 are forced to slide axially away from opening 234 to take up the running clearance between the discs within the brake (FIG. 7B). Once a predetermined pressure has been reached within outer piston chamber 222, the pressurized hydraulic fluid will begin acting upon outer piston 220 to move it axially away from end surface 218 of bore 214. The predetermined pressure at which outer piston 220 begins to move axially is determined by the force necessary to compress spring 240. When outer piston 220 moves away from plug 219 and projection 264, ball 262 is forced against cage 260 by spring 261, thereby preventing additional fluid flow into or out of inner piston chamber 258. Outer piston 220 then moves axially against the biasing force of compression spring 240 to create a braking force (FIG. 7C), as discussed above.

It is thus evident that a slave cylinder constructed as described herein accomplishes the objects of the present invention and otherwise substantially improves the art.

What is claimed is:

1. A two-stage slave cylinder comprising a housing, a bore in said housing, an outer piston in said bore in said housing movable between an unactuated position and an actuated position, a bore in said outer piston, an inner piston in said bore in said outer piston movable between an unactuated position and an actuated position, an outer piston chamber formed by said bore in said housing and said outer piston, an inner piston chamber formed by said bore in said outer piston and said inner piston, an opening in said outer piston providing fluid communication between said outer piston chamber and said inner piston chamber, and a valve assembly positioned in said opening to control hydraulic fluid flow between said inner piston chamber and said outer piston chamber, said valve assembly adapted to close upon movement of said outer piston from the unactuated position, the closing of said valve assembly trapping a volume of fluid within said inner piston chamber, said valve assembly engaging a projection extending from said housing into said opening to maintain said valve assembly in an open position when said outer piston is in the unactuated position.

2. The two-stage slave cylinder of claim 1, further comprising a biasing mechanism acting to bias said outer piston in an unactuated position.

3. The two-stage slave cylinder of claim 1, further comprising a piston rod recess in an end of said inner piston, and a piston rod received in said piston rod recess.

4. The two-stage slave cylinder of claim 1, further comprising an annular seal disposed around said inner piston and in contact with said bore in said outer piston.

5. The two-stage slave cylinder of claim 1, further comprising an annular seal disposed around said outer piston and in contact with said bore in said housing.

6. The two-stage slave cylinder of claim 1, wherein said bore in said housing includes an open end and an end wall, and wherein said bore in said housing, said end wall, and said outer piston define said outer piston chamber.

7. The two-stage slave cylinder of claim 6, further comprising a fluid passageway in said housing adapted to connect said outer piston chamber to a hydraulic fluid source.

8. The two-stage slave cylinder of claim 7, wherein said bore in said outer piston includes an open end and an end wall, and wherein said bore in said outer piston, said end wall and said inner piston define said inner piston chamber.

9. The two-stage slave cylinder of claim 8, wherein fluid flow into said inner piston chamber causes said inner piston to slide within said bore in said outer piston.

10. A two-stage slave cylinder comprising a housing, a bore in said housing, an outer piston in said bore in said housing movable between an unactuated position and an actuated position, a bore in said outer piston, an inner piston in said bore in said outer piston movable between an unactuated position and an actuated position, an outer piston chamber formed by said bore in said housing and said outer piston, an inner piston chamber formed by said bore in said outer piston and said inner piston, an opening in said outer piston providing fluid communication between said outer piston chamber and said inner piston chamber, and a valve assembly positioned in said opening to control hydraulic fluid flow between said inner piston chamber and said outer piston chamber, said valve assembly adapted to close upon movement of said outer piston from the unactuated position, the closing of said valve assembly trapping a volume of fluid within said inner piston chamber, said valve assembly also being adapted to open upon movement of said outer piston to the unactuated position, wherein said valve assembly includes a plug having an annular flange, the plug positioned in said opening in said outer piston with said flange positioned in said inner piston chamber, an annular seal disposed around said plug, and a biasing mechanism biasing said flange of said plug against said end wall of said outer piston.

11. The two-stage slave cylinder of claim 10, wherein said biasing mechanism acting on said outer piston provides a greater force than said biasing mechanism acting on said plug.

12. A two-stage slave cylinder comprising a housing, a bore in said housing, an outer piston positioned within said bore in said housing and movable between an unactuated position and an actuated position, an outer piston chamber defined by said bore and said outer piston, a fluid passageway adapted to connect said outer piston chamber to a hydraulic fluid source, a biasing mechanism acting to bias said outer piston in an unactuated position, a bore in said outer piston, an inner piston positioned within said bore in said outer piston and movable between an unactuated position and an actuated position, an inner piston chamber defined by said bore in said outer piston and said inner piston, and an opening in said outer piston to connect said outer piston chamber to said inner piston chamber, a valve assembly positioned in said opening and including a valve biased to a closed position, and a plug extending from said housing into said opening, said plug engaging said valve to maintain said valve assembly in an open position while said outer piston is in the unactuated position for allowing hydraulic fluid to enter said inner piston chamber to actuate said inner piston, said valve adapted to close when said outer piston moves from the unactuated position toward the actuated position to trap a volume of fluid within said inner piston chamber and to open when said outer piston returns to the unactuated position to release the volume of fluid within the inner piston chamber.

13. The two-stage slave cylinder of claim 12, further comprising a piston rod recess in said inner piston, and a piston rod received in said piston rod recess.

* * * * *